(12) United States Patent
Tamane et al.

(10) Patent No.: US 11,029,840 B2
(45) Date of Patent: Jun. 8, 2021

(54) VEHICLE MANIPULATION DEVICE, VEHICLE SYSTEM, VEHICLE MANIPULATION METHOD, AND STORAGE MEDIUM

(71) Applicants: Toyota Jidosha Kabushiki Kaisha, Toyota (JP); Nomura Research Institute, Ltd., Tokyo (JP); Kabushiki Kaisha Tokai Rika Denki Seisakusho, Aichi (JP)

(72) Inventors: Yasuyuki Tamane, Miyoshi (JP); Tsukasa Takahashi, Tokyo (JP); Masaki Oshima, Aichi-ken (JP)

(73) Assignees: Toyota Jidosha Kabushiki Kaisha, Toyota (JP); Nomura Research Institute, Ltd., Tokyo (JP); Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 16/165,117

(22) Filed: Oct. 19, 2018

(65) Prior Publication Data

US 2019/0121535 A1   Apr. 25, 2019

(30) Foreign Application Priority Data

Oct. 23, 2017 (JP) .............................. JP2017-204766

(51) Int. Cl.
*G06F 3/0488* (2013.01)
*G06F 3/0484* (2013.01)
(Continued)

(52) U.S. Cl.
CPC ...... *G06F 3/04883* (2013.01); *B60R 25/2045* (2013.01); *B60R 25/24* (2013.01);
(Continued)

(58) Field of Classification Search
CPC ............ G07C 9/00896; B60R 25/2045; G06F 3/04883; G06F 3/0484
See application file for complete search history.

(56) References Cited

U.S. PATENT DOCUMENTS 9,162,648 B1 * 10/2015 Weng ....................... B60R 25/24
10,187,793 B2 * 1/2019 Petel ..................... H04L 63/0492
(Continued)

FOREIGN PATENT DOCUMENTS

CN   106558128 A   4/2017
JP   2006118122 A   5/2006
(Continued)

OTHER PUBLICATIONS

Christina Warren, "Want to Remotely Start Your Car? There's an App for That", published on Oct. 13, 2009 to https://mashable.com/2009/10/13/viper-smartstart/, retrieved Jul. 16, 2020 (Year: 2009).*
(Continued)

*Primary Examiner* — Shourjo Dasgupta
(74) *Attorney, Agent, or Firm* — Dinsmore & Shohl LLP

(57) ABSTRACT

A vehicle manipulation device is configured to control a vehicle by wirelessly communicating with a communication device in the vehicle, and includes a touch panel, a detection unit, and a request unit. The detection unit is configured to detect an input manipulation of a user with respect to the touch panel. The request unit is configured to transmit a control request for causing the vehicle to perform a first operation to the communication device in response to detection of an input manipulation in a first aspect, the first operation being any one of locking and unlocking of the vehicle, and transmit a control request for causing the vehicle to perform a second operation to the communication device in response to detection of an input manipulation in a second aspect different from the first aspect, the second
(Continued)

| BUTTON | INPUT METHOD | REQUESTED OPERATION |
|---|---|---|
| (212) | TAP | LOCKING OF DOOR |
| (213) | TAP | UNLOCKING OF DOOR |
| (214) | LONG TAP | CLOSING OF DOOR |
| | SLIDE | CLOSING AND LOCKING OF DOOR |
| (215) | LONG TAP | UNLOCKING OF DOOR |
| | SLIDE | UNLOCKING AND OPENING OF DOOR | operation including an operation different from locking and unlocking of the vehicle.

19 Claims, 11 Drawing Sheets

(51) Int. Cl.
*G07C 9/00* (2020.01)
*B60R 25/20* (2013.01)
*B60R 25/24* (2013.01)
*E05B 81/56* (2014.01)

(52) U.S. Cl.
CPC ....... *G06F 3/0484* (2013.01); *G07C 9/00309* (2013.01); *G07C 9/00571* (2013.01); *G07C 9/00896* (2013.01); *E05B 81/56* (2013.01); *G07C 9/00817* (2013.01); *G07C 2009/00793* (2013.01)

(56) References Cited

U.S. PATENT DOCUMENTS

| | | | | |
|---|---|---|---|---|
| 10,403,133 | B1* | 9/2019 | Christensen | G01C 21/3415 |
| 2003/0122882 | A1* | 7/2003 | Kho | G06F 3/0482 |
| | | | | 715/864 |
| 2004/0117436 | A1* | 6/2004 | Newman | G06Q 10/06 |
| | | | | 709/203 |
| 2007/0126603 | A1* | 6/2007 | Driscoll | G08G 1/14 |
| | | | | 340/988 |
| 2008/0309451 | A1* | 12/2008 | Zellweger | E05B 19/0082 |
| | | | | 340/3.32 |
| 2010/0075655 | A1* | 3/2010 | Howarter | G07C 9/00309 |
| | | | | 455/420 |
| 2013/0237189 | A1* | 9/2013 | Nishidai | H04W 12/06 |
| | | | | 455/411 |
| 2014/0256304 | A1* | 9/2014 | Frye | H04W 4/40 |
| | | | | 455/418 |
| 2015/0161834 | A1* | 6/2015 | Spahl | G07C 9/00111 |
| | | | | 340/5.61 |
| 2015/0193138 | A1* | 7/2015 | Relyea | G06F 3/04883 |
| | | | | 725/52 |
| 2015/0362997 | A1* | 12/2015 | Hatton | G06F 3/017 |
| | | | | 701/2 |
| 2016/0251890 | A1 | 9/2016 | Sakai | |
| 2017/0092030 | A1 | 3/2017 | Badger, II | |
| 2017/0192671 | A1* | 7/2017 | Osborne | G06F 3/0236 |
| 2017/0268278 | A1 | 9/2017 | Ichinose et al. | |
| 2017/0277296 | A1* | 9/2017 | Reynolds | G06F 3/0412 |
| 2018/0059912 | A1* | 3/2018 | Takikawa | G06F 3/04886 |
| 2018/0099642 | A1* | 4/2018 | Tomita | E05F 15/77 |
| 2018/0176003 | A1* | 6/2018 | Hayes | H04L 27/18 |
| 2018/0275654 | A1* | 9/2018 | Merz | G08G 5/0013 |
| 2019/0027028 | A1* | 1/2019 | Fields | G08G 1/005 |

FOREIGN PATENT DOCUMENTS

| | | |
|---|---|---|
| JP | 2011-256561 A | 12/2011 |
| JP | 2012-046985 A | 3/2012 |
| JP | 2016-160589 A | 9/2016 |
| JP | 2017-166240 A | 9/2017 |
| WO | 2015174526 A1 | 11/2015 |
| WO | WO-2018113031 A1 * | 6/2018 ............. H04M 1/23 |

OTHER PUBLICATIONS

"Remote Start & Security Systems", published on May 20, 2014 to https://www.mobilesystemsllc.com/products/remote-start-security-systems/, retrieved Jul. 16, 2020 (Year: 2014).*

* cited by examiner

| BUTTON | INPUT METHOD | REQUESTED OPERATION |
| --- | --- | --- |
| (212) | TAP | LOCKING OF DOOR |
| (213) | TAP | UNLOCKING OF DOOR |
| (214) | LONG TAP | CLOSING AND LOCKING OF DOOR |
| (215) | LONG TAP | UNLOCKING AND OPENING OF DOOR |

FIG. 12A

| BUTTON | INPUT METHOD | REQUESTED OPERATION |
|---|---|---|
| (212) | TAP | LOCKING OF DOOR |
| (213) | TAP | UNLOCKING OF DOOR |
| (214) | LONG TAP | CLOSING OF DOOR |
| (215) | LONG TAP | UNLOCKING OF DOOR |

FIG. 12B

| BUTTON | INPUT METHOD | REQUESTED OPERATION |
|---|---|---|
| (212) | TAP | LOCKING OF DOOR |
| (213) | TAP | UNLOCKING OF DOOR |
| (214) | LONG TAP | CLOSING OF DOOR |
| (214) | SLIDE | CLOSING AND LOCKING OF DOOR |
| (215) | LONG TAP | UNLOCKING OF DOOR |
| (215) | SLIDE | UNLOCKING AND OPENING OF DOOR |

VEHICLE MANIPULATION DEVICE, VEHICLE SYSTEM, VEHICLE MANIPULATION METHOD, AND STORAGE MEDIUM

CROSS-REFERENCE TO RELATED APPLICATIONS

This application claims priority to Japanese Patent Application No. 2017-204766 filed on Oct. 23, 2017, which is incorporated herein by reference in its entirety including the specification, drawings and abstract.

BACKGROUND

1. Technical Field

The present disclosure relates to a vehicle manipulation device, a vehicle system, a vehicle manipulation method, and a storage medium.

2. Description of Related Art

A key management system in which since a mobile terminal can acquire authentication information for locking and unlocking a vehicle from a server device over a network and unlock a door, the mobile terminal can be used as an electronic key is known (Japanese Unexamined Patent Application Publication No. 2006-118122 (JP 2006-118122 A) and Japanese Unexamined Patent Application Publication No. 2011-256561 (JP 2011-256561 A)).

A device capable of controlling locking, unlocking, opening, and closing of a door based on a touch manipulation using a touch panel display in a vehicle is known (Japanese Unexamined Patent Application Publication No. 2017-166240 (JP 2017-166240 A)).

SUMMARY

It is conceivable to combine the two technologies described above to enable locking, unlocking, opening, and closing of a door of a vehicle to be manipulated by a touch manipulation on a touch panel display of a mobile terminal. Here, in the touch panel display of the mobile terminal, there is a problem in that it is easy to cause an erroneous manipulation such as touching a position different from a position originally intended by a user or unintentionally touching a position.

The present disclosure provides a vehicle manipulation device, a vehicle system, a vehicle manipulation method, and a storage medium that suppress an erroneous manipulation in the vehicle manipulation device and support the accuracy of a manipulation.

A first aspect of the present disclosure relates to a vehicle manipulation device configured to control a vehicle by wirelessly communicating with a communication device in the vehicle. The vehicle manipulation device includes a touch panel; a detection unit configured to detect an input manipulation of a user with respect to the touch panel; and a request unit configured to transmit a control request for causing the vehicle to perform a first operation to the communication device in response to detection of an input manipulation in a first aspect, the first operation being any one of locking and unlocking of the vehicle, and configured to transmit a control request for causing the vehicle to perform a second operation to the communication device in response to detection of an input manipulation in a second aspect different from the first aspect, the second operation including an operation different from locking and unlocking of the vehicle.

The detection unit according to the first aspect of the present disclosure is configured to detect the input manipulation of a user with respect to the touch panel. The detection unit, for example, may be configured to detect a position on the touch panel on which the input manipulation has been performed and an aspect of the input manipulation. The aspect of the input manipulation includes, for example, a tap input (short pressing), a long tap input (long pressing), a double tap input, a slide input, and a gesture input.

The request unit in the first aspect of the present disclosure is configured to transmit the control request for causing the vehicle to perform the first operation to the communication device in response to the detection of the input manipulation in the first aspect. Here, the first operation is an operation of any one of locking and unlocking of the vehicle. The request unit transmits the control request for causing the vehicle to perform the second operation to the communication device in response to the detection of the input manipulation in the second aspect different from the first aspect. Here, the second operation includes an operation different from locking and unlocking of the vehicle. The second operation may further include locking or unlocking of the vehicle when the second operation includes an operation different from the locking and unlocking of the vehicle.

In the vehicle manipulation device according to the first aspect of the present disclosure, the request unit may be configured to transmit a control request for causing the vehicle to perform the first operation to the communication device in response to an input manipulation in the first aspect in an area of the touch panel corresponding to the first operation, and configured to transmit a control request for causing the vehicle to perform the second operation to the communication device in response to an input manipulation in the second aspect in an area of the touch panel corresponding to the second operation.

According to the first aspect of the present disclosure, since input aspects needed in the locking, unlocking, and other operations of the vehicle are different, it is possible to suppress a user from performing a manipulation not intended by the user, and to support the accuracy of the manipulation.

In the vehicle manipulation device according to the first aspect of the present disclosure, the area of the touch panel corresponding to the first operation may be a display area of a first user interface (UI) element on the touch panel. The area of the touch panel corresponding to the second operation may be a display area of a second UI element different from the first UI element on the touch panel.

In the vehicle manipulation device according to the first aspect of the present disclosure, the input manipulation in the first aspect and the input manipulation in the second aspect may be any one of a tap input, a double tap input, a long tap input, a slide input, and a gesture input on the touch panel.

In the vehicle manipulation device according to the first aspect of the present disclosure, the input manipulation in the first aspect may be a tap input on the touch panel. The input manipulation in the second aspect may be any one of a double tap input, a long tap input, a slide input, and a gesture input on the touch panel.

In the vehicle manipulation device according to the first aspect of the present disclosure, the second operation may include locking or unlocking of the vehicle and an operation different from the locking and unlocking of the vehicle, and the request unit may be configured to transmit a control request for causing the vehicle to perform locking or unlocking of the vehicle and an operation different from the locking and unlocking of the vehicle to the communication device in response to detection of the input manipulation in the second aspect.

In the vehicle manipulation device according to the first aspect of the present disclosure, the second operation may be an operation of opening and closing an opening and closing body included in the vehicle. Examples of the opening and closing body included in the vehicle are a door for getting on and off, a bonnet, a trunk, and a rear hatch. When the input aspect for performing locking and unlocking of the vehicle is a tap input and the operation of opening and closing the opening and closing body is an aspect other than the tap input, it is possible to particularly reduce the possibility of a user unintentionally opening and closing the opening and closing body.

In the vehicle manipulation device according to the first aspect of the present disclosure, the second operation (an operation requested when the input manipulation in the second aspect is performed) may include a plurality of operations including locking or unlocking of the vehicle and an operation different from the locking and unlocking of the vehicle. An example of the operation different from the locking and unlocking of the vehicle can include an operation of opening and closing an opening and closing body included the vehicle. In the vehicle manipulation device according to the first aspect of the present disclosure, the request unit may be configured to transmit a control request for causing the vehicle to perform unlocking of the vehicle and an operation of opening an opening and closing body included in the vehicle, or an operation of closing the opening and closing body and locking of the vehicle to the communication device in response to the detection of the input manipulation in the second aspect.

A second aspect of the present disclosure relates to a vehicle system including: the vehicle manipulation device; a vehicle control device configured to perform control of the vehicle, the vehicle control device being mounted in the vehicle; and a communication device mounted on the vehicle, the communication device including a first communication module configured to perform communication with the vehicle manipulation device in a first communication standard, and a second communication module configured to perform communication with the vehicle control device in a second communication standard different from the first communication standard. The vehicle manipulation device is configured to transmit the control request to the communication device together with first authentication information. The communication device is configured to transmit a second control request corresponding to the control request to the vehicle control device together with second authentication information when authentication of the first authentication information is successful. The vehicle control device is configured to execute an operation instructed by the second control request when authentication of the second authentication information is successful.

A third aspect of the present disclosure relates to a vehicle manipulation method that is performed by a vehicle manipulation device including a touch panel. The vehicle manipulation method includes detecting an input manipulation of a user with respect to the touch panel; and transmitting a control request for causing a vehicle to perform a first operation to a communication device in the vehicle in response to detection of an input manipulation in a first aspect, the first operation being any one of locking and unlocking of the vehicle, and transmitting a control request for causing the vehicle to perform a second operation to the communication device in response to detection of an input manipulation in a second aspect different from the first aspect, the second operation including an operation different from locking and unlocking of the vehicle.

A fourth aspect of the present disclosure relates to a storage medium. The storage medium stores a program and is a computer-readable non-transitory storage medium. The program causes a computer including a touch panel to execute: a detection step of detecting an input manipulation of a user with respect to the touch panel; and a request step of transmitting a control request for causing a vehicle to perform a first operation to a communication device in the vehicle in response to detection of an input manipulation in a first aspect, the first operation being any one of locking and unlocking of the vehicle, and transmitting a control request for causing the vehicle to perform a second operation to the communication device in response to detection of an input manipulation in a second aspect different from the first aspect, the second operation including an operation different from locking and unlocking of the vehicle.

In the storage medium according to the fourth aspect of the present disclosure, the request step may include transmitting a control request for causing the vehicle to perform the first operation to the communication device in response to an input manipulation in the first aspect in an area of the touch panel corresponding to the first operation. The request step may include transmitting a control request for causing the vehicle to perform the second operation to the communication device in response to an input manipulation in the second aspect in an area of the touch panel corresponding to the second operation.

In the storage medium according to the fourth aspect of the present disclosure, the area of the touch panel corresponding to the first operation may be a display area of a first UI element on the touch panel. The area of the touch panel corresponding to the second operation may be a display area of a second UI element different from the first UI element on the touch panel.

In the storage medium according to the fourth aspect of the present disclosure, the input manipulation in the first aspect and the input manipulation in the second aspect may be any one of a tap input, a double tap input, a long tap input, a slide input, and a gesture input on the touch panel.

In the storage medium according to the fourth aspect of the present disclosure, the input manipulation in the first aspect may be a tap input on the touch panel. The input manipulation in the second aspect may be any one of a double tap input, a long tap input, a slide input, and a gesture input on the touch panel.

In the storage medium according to the fourth aspect of the present disclosure, the second operation may include locking or unlocking of the vehicle and an operation different from the locking and unlocking of the vehicle. The request step may include transmitting a control request for causing the vehicle to perform locking or unlocking of the vehicle and an operation different from the locking and unlocking of the vehicle to the communication device in response to detection of the input manipulation in the second aspect.

In the storage medium according to the fourth aspect of the present disclosure, the second operation may be an operation of opening and closing an opening and closing body included in the vehicle.

In the storage medium according to the fourth aspect of the present disclosure, the request step may include transmitting a control request for causing the vehicle to perform unlocking of the vehicle and an operation of opening the opening and closing body included in the vehicle, or an operation of closing the opening and closing body and locking of the vehicle to the communication device in response to the detection of the input manipulation in the second aspect.

The present disclosure can be specified as a vehicle control device or a vehicle system including at least some of the above aspects. The present disclosure can also be specified as a control method for executing the process described above, a program for causing the computer to execute the control method, or a computer-readable medium storing the program non-transitory. The processes or structures can be freely combined and implemented as long as technical contradiction does not occur.

According to the present disclosure, it is possible to suppress an erroneous manipulation in the vehicle manipulation device and support the accuracy of the manipulation.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 12A illustrates a table showing a modification example of an input method of manipulation buttons displayed on a manipulation screen and a requested operation; and FIG. 12B illustrates a table showing a modification example of the input method of manipulation buttons displayed on the manipulation screen and a requested operation.

DETAILED DESCRIPTION OF EMBODIMENTS

First Embodiment

System Overview

Figure 1:
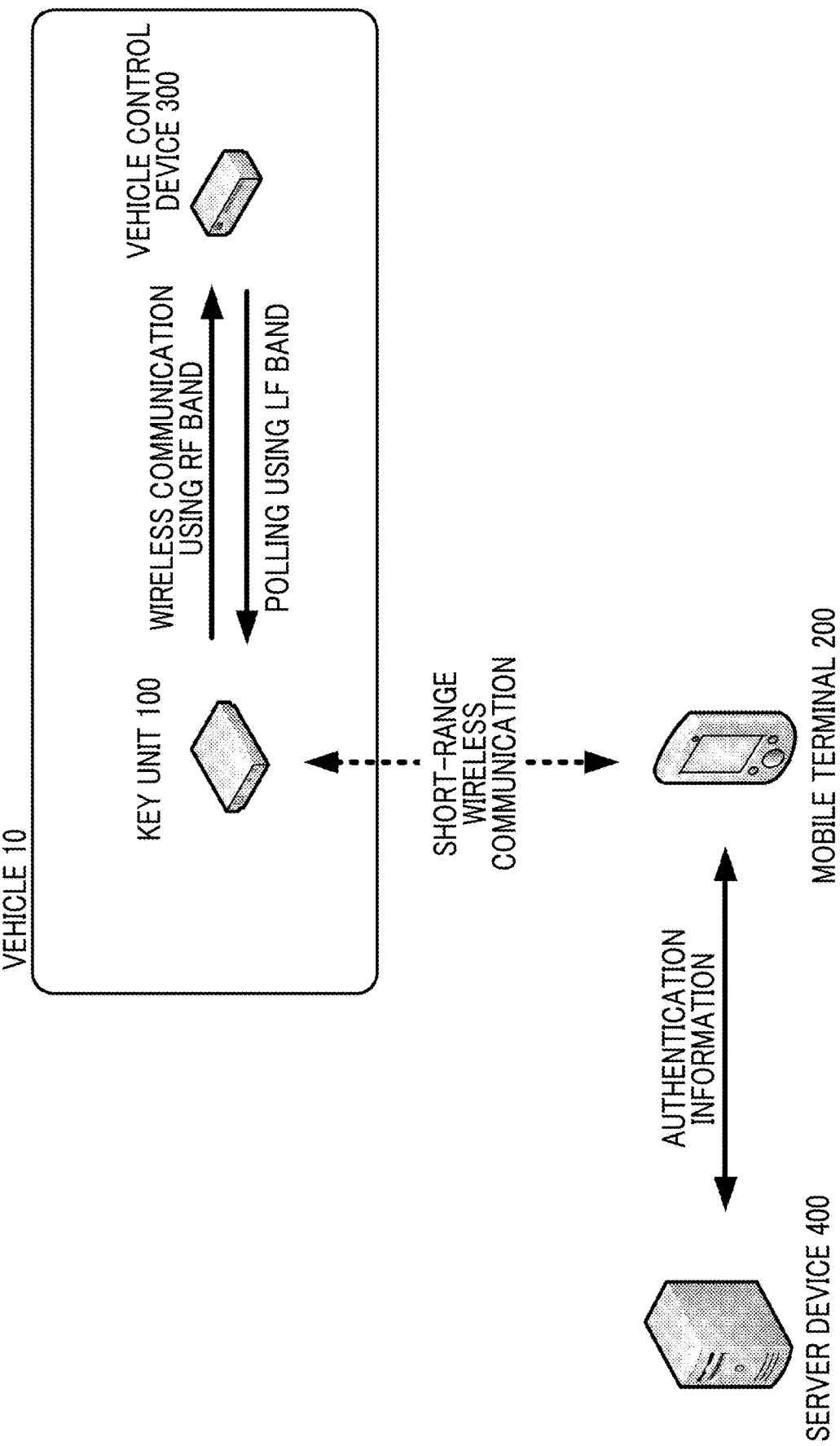
FIG. 1 is a system schematic diagram of a locking and unlocking system according to an embodiment.

An overview of a vehicle control system according to a first embodiment will be described with reference to FIG. 1. The vehicle control system according to this embodiment includes a key unit (a communication device) 100 and a vehicle control device 300 mounted on a vehicle 10, a mobile terminal 200, and a server device 400.

In the vehicle control system according to the embodiment, the key unit 100 includes the same wireless interface as an electronic key (a portable device) of a smart key, and locking, unlocking, or other vehicle manipulations can be performed without using physical keys by communication with the vehicle control device 300. The key unit 100 performs short-range wireless communication with the mobile terminal 200, and determines whether or not the key unit 100 behaves as an electronic key (a vehicle manipulation device) of the vehicle 10 based on a result of authenticating the mobile terminal 200. That is, a user of the system can perform locking, unlocking, or other vehicle manipulations by manipulating the mobile terminal 200 from the outside of the vehicle 10.

The vehicle control system according to the embodiment is configured to be able to perform not only locking and unlocking of the vehicle 10 but also other vehicle manipulations such as opening and closing of doors. Here, in order to suppress unintended vehicle manipulation from being performed due to an erroneous manipulation of the mobile terminal 200 of the user, an appropriate user interface is used on the mobile terminal 200 in the embodiment.

System Configuration

Figure 2:
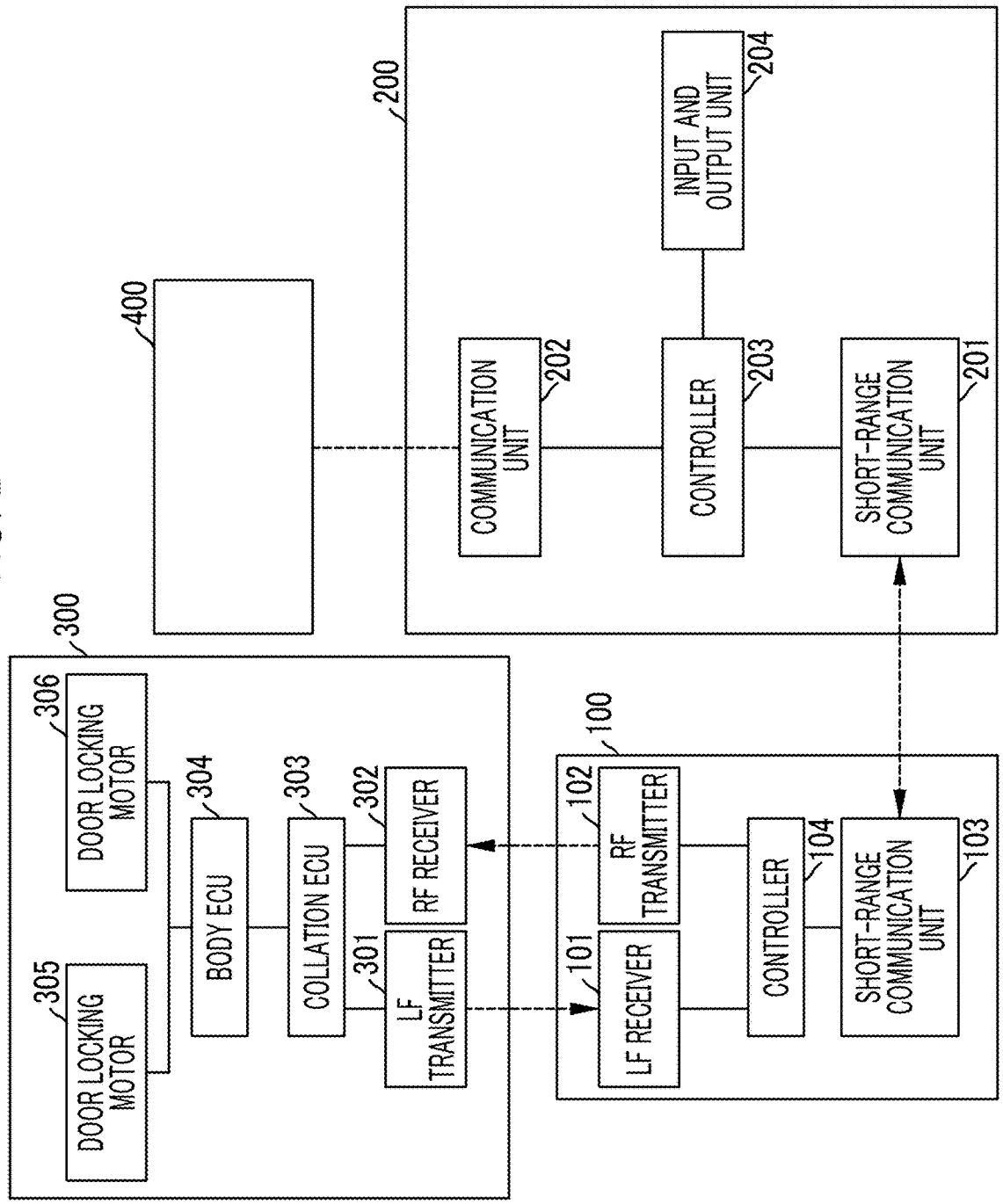
FIG. 2 is a block diagram schematically illustrating an example of components of the locking and unlocking system.

Components of the system will be described in detail. FIG. 2 is a block diagram schematically illustrating an example of a configuration of the key unit 100, the mobile terminal 200, the vehicle control device 300, and the server device 400 illustrated in FIG. 1. Among them, the key unit 100 and the vehicle control device 300 are mounted on the vehicle 10 that is a target of locking and unlocking.

Vehicle Control Device 300

The vehicle control device 300 is a device for locking, unlocking, opening, and closing doors of the vehicle and is a device constituting a part of the smart key system. The vehicle control device 300 performs locking, unlocking, opening, and closing doors of the vehicle 10 according to a vehicle control signal that is transmitted from an electronic key (hereinafter referred to as a portable device) possessed by a user of the vehicle via radio waves in a radio frequency (hereinafter referred to as an RF) band. The vehicle control device 300 has a function of transmitting radio waves in a low frequency (hereinafter referred to as a LF) band for searching for a portable device.

In the embodiment, the key unit 100 transmits and receives the radio waves in the RF band and the LF band instead of the portable device possessed by the user to control the locking, unlocking, opening, and closing of the door of the vehicle. Hereinafter, unless otherwise noted, description will be given in which a communication destination of the vehicle control device 300 is limited to the key unit 100.

The vehicle control device 300 includes an LF transmitter 301, an RF receiver 302, a collation ECU 303, a body ECU 304, a door locking motor 305, and a door opening and closing motor 306. The vehicle control device 300 operates with electric power supplied from an auxiliary battery (not illustrated) mounted on the vehicle 10.

The LF transmitter 301 transmits radio waves in the low frequency band (for example, 100 KHz to 300 KHz) for searching (polling) the key unit 100. The LF transmitter 301 is built in, for example, the vicinity of a center console or a steering wheel in a vehicle cabin.

The RF receiver 302 receives radio waves in the radio frequency band (for example, 100 MHz to 1 GHz) transmitted from the key unit 100. The RF receiver 302 is built in the vehicle cabin.

The collation ECU 303 is a computer that performs control to lock and unlock the doors of the vehicle 10 and open and close the doors based on a signal (a locking signal or an unlocking signal) transmitted from the key unit 100 via the radio waves in the RF band. The collation ECU 303 is configured of, for example, a microcomputer.

In the following description, signals for instructing the vehicle 10 to unlock, lock, open and close the doors are collectively referred to as a vehicle control signal. The vehicle control signal is a signal for instructing the vehicle 10 to perform at least one of unlocking, locking, opening, and closing the door. Examples of the vehicle control signal include a signal for instructing unlocking of a door, a signal for instructing unlocking and opening of a door, a signal for instructing locking of a door, and a signal for instructing closing and locking of a door.

Figure 3:
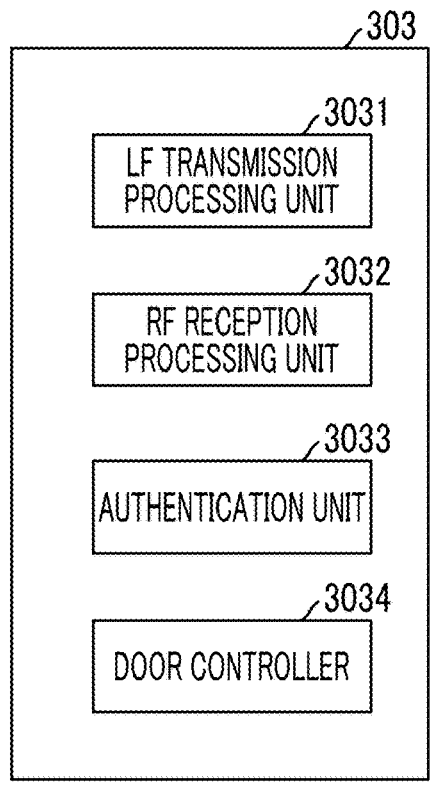
FIG. 3 illustrates an example of functional modules included in a collation electronic control unit (ECU)

FIG. 3 illustrates functional modules included in the collation ECU 303. Each of the functional modules illustrated in FIG. 3 may be realized by a program stored in storage unit (read only memory (ROM) or the like) being executed by a central processing unit (CPU) (both not illustrated).

An LF transmission processing unit 3031 performs control to transmit a polling signal (a request signal) as radio waves in the LF band to the vehicle cabin via the LF transmitter 301. An RF reception processing unit 3032 performs control to receive the vehicle control signal transmitted as radio waves in the RF band from the key unit 100 via the RF receiver 302. An authentication unit 3033 authenticates that the vehicle control signal transmitted from the key unit 100 is a vehicle control signal transmitted from an authorized device. Specifically, the authentication unit 3033 determines whether or not a key ID included in the vehicle control signal matches a key ID stored in storage unit (not illustrated) of the collation ECU 303 in advance. Specific content will be described below.

A door controller 3034 transmits at least one of an unlocking command, a locking command, an opening command, and a closing command to the body ECU 304 to be described below based on a result of authentication performed by the authentication unit 3033. The signal is transmitted via an in-vehicle network such as a controller area network (CAN).

The body ECU 304 is a computer that controls a body of the vehicle. The body ECU 304 has a function of controlling the door locking motor 305 or the door opening and closing motor 306 (to be described below) based on a command received from the door controller 3034 to perform unlocking and locking the door of the vehicle or opening and closing the door. The body ECU 304 may further have a function of performing controls of elements associated with the vehicle body, such as power window control, seat adjustment, anti-theft, seatbelt control, and headlight control.

The door locking motor 305 is an actuator that locks and unlocks the doors of the vehicle 10 (including a trunk, as well as doors for getting on and off or a rear gate). The door locking motor 305 operates based on a signal transmitted from the body ECU 304.

The door opening and closing motor 306 is an actuator that opens and closes the door (including the trunk as well as the door for getting on and off and the rear gate) of the vehicle 10. The door opening and closing motor 306 operates based on a signal transmitted from the body ECU 304.

The door controller 3034 may transmit solely information indicating that authentication has been successful, to the body ECU 304 instead of the unlocking command or the locking command. With the above-described configuration, it is possible to cause a locking or unlocking operation to be performed using, an action of the user (for example, pressing of the unlocking button or touch to a door knob) as a trigger.

The collation ECU 303 may communicate with the body ECU 304 to control targets other than the doors. The collation ECU 303 may control startup or stop of the engine by communicating with the engine ECU or may perform other control on the vehicle. That is, a device that is a manipulation target of the vehicle control device 300 is not particularly limited.

Key Unit 100

Next, the key unit 100 will be described. The key unit 100 is a communication device disposed inside the vehicle 10 and has a function of authenticating the mobile terminal 200 by performing short-range wireless communication with the mobile terminal 200, and a function of transmitting a signal for controlling the vehicle 10 using radio waves in the RF band based on a result of authenticating the mobile terminal 200. The key unit 100 includes an LF receiver 101, an RF transmitter 102, a short-range communication unit 103, and a controller 104.

In the embodiment, the key unit 100 is disposed at a predetermined position in the vehicle cabin (for example, in a glove box) and operates with electric power supplied from an auxiliary battery (not illustrated) mounted on the vehicle 10.

The LF receiver 101 receives a polling signal transmitted from the vehicle control device 300 via the radio waves in the LF band. The LF receiver 101 includes an antenna (hereinafter referred to as an LF antenna) for receiving the radio waves in the LF band. The RF transmitter 102 transmits a vehicle control signal to the key unit 100 via the radio waves in the RF band. The communication using the radio waves in the LF band and the RF band corresponds to a second communication standard, and the LF receiver 101 and the RF transmitter 102 correspond to a second communication module.

The short-range communication unit 103 communicates with the mobile terminal 200 possessed by the user. The short-range communication unit 103 performs communication at a short-range (an extent that communication can be performed inside and outside the vehicle cabin) using a predetermined wireless communication standard (the first communication standard). The short-range communication unit 103 corresponds to a first communication module.

In the embodiment, the short-range communication unit 103 performs data communication based on the Bluetooth (registered trademark) Low Energy standard (hereinafter referred to as a BLE). The BLE is a low power communication standard based on Bluetooth, and has characteristics that communication can be started immediately by detecting a partner without requiring pairing of devices. Although the BLE is exemplified in the embodiment, other wireless communication standards can also be used. For example, Near Field Communication (NFC), Ultra Wide Band (UWB), or WiFi (registered trademark) can be used.

The controller 104 is a computer that performs short-range wireless communication with the mobile terminal 200 and performs control to authenticate the mobile terminal 200 and control to transmit, the vehicle control signal based on an authentication result. The controller 104 is configured of, for example, a microcomputer.

Figure 4:
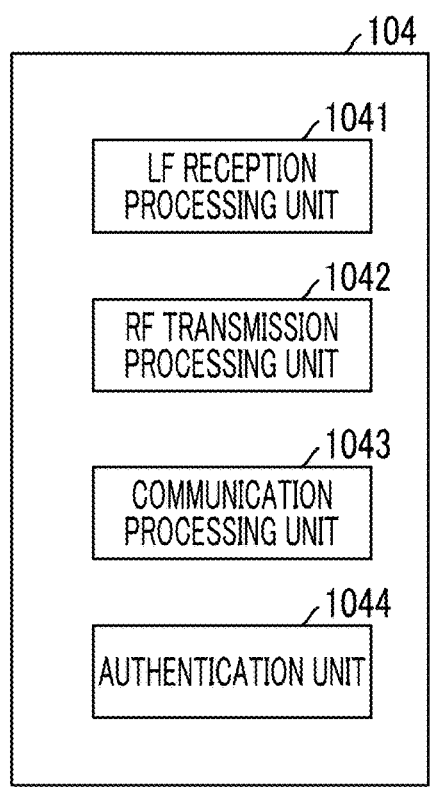
FIG. 4 illustrates an example of functional modules included in a controller of a key unit.

Functional modules included in the controller 104 are illustrated in FIG. 4. Each of the functional modules illustrated in FIG. 4 may be realized by a program stored in storage unit (a ROM or the like) being executed by a CPU (both not illustrated).

An LF reception processing unit 1041 performs control to receive the polling signal transmitted as radio waves in the LF band from the vehicle control device 300 via the LF receiver 101.

An RF transmission processing unit 1042 performs a control to transmit the vehicle control signal as radio waves in the RF band via the RF transmitter 102. The vehicle control signal is generated by a communication processing unit 1043 to be described below when an authentication unit 1044 to be described below causes the authentication of the mobile terminal 200 to be successful.

A communication processing unit 1043 processes communication with the mobile terminal 200 via the short-range communication unit 103. Specifically, the communication processing unit 1043 receives a request for locking, unlocking, opening, and closing a door (hereinafter collectively referred to as a control request) from the mobile terminal 200, and generates a vehicle control signal according to the received request. The generated vehicle control signal is temporarily stored, and is output at a timing when the authentication unit 1044 to be described below successfully authenticates the mobile terminal 200.

The authentication unit 1044 performs authentication of the mobile terminal 200 based on the authentication information included in the control request transmitted from the mobile terminal 200. Specifically, the authentication unit 1044 compares the authentication information stored in storage unit (not illustrated) with the authentication information transmitted from the mobile terminal 200, and determines that the authentication has been successful when both the pieces of authentication information match. When the two pieces of authentication information do not match, the authentication unit 1044 determines that authentication has failed. When the authentication unit 1044 successfully authenticates the mobile terminal 200, the vehicle control signal generated by the communication processing unit 1043 is output to the RF transmission processing unit 1042 and is wirelessly transmitted to the vehicle control device 300.

A scheme of the authentication performed by the authentication unit 1044 may be a scheme of simply comparing the authentication information with each other to verify the identity or a scheme using asymmetric encryption.

Hereinafter, it is assumed that the authentication information stored in the key unit 100 is referred to as device authentication information, and the authentication information transmitted from the mobile terminal 200 is referred to as terminal authentication information, as needed for description.

Although the authentication unit 1044 generates a transmission trigger of the vehicle control signal in the example, the authentication unit 1044 may control a power supply of the key unit 100 based on an authentication situation. For example, in a situation in which authentication of the mobile terminal 200 is hot performed, all the components other than the communication processing unit 1043 and the authentication unit 1044 are caused to enter a suspend state, and when the authentication is successful, all of the components may be caused to enter an energized state in a predetermined period (for example, until a response to the transmitted vehicle control signal is present from the vehicle control device 300). The realizing method is not limited as long as the vehicle control signal can be transmitted solely when the authentication is successful.

The key unit 100 (the RF transmitter 102) simultaneously transmits the vehicle control signal and an ID of the electronic key (hereinafter referred to as a key ID) to the vehicle control device 300. The key ID may be stored in the key unit 100 in a plaintext state in advance or may be stored in a state encrypted with a cryptogram unique to the mobile terminal 200. When the key ID is encrypted and stored, the encrypted key ID may be decoded using authentication information transmitted from the mobile terminal 200 such that an original key ID can be obtained.

Mobile Terminal 200

Next, the mobile terminal 200 will be described. Since the mobile terminal 200 is a device that is used by the user, the mobile terminal 200 in the specification can also be referred to as a user device.

The mobile terminal 200 is a smartphone, a mobile phone, a tablet terminal, a personal information terminal, or a compact computer such as a wearable computer (smart watch or the like). The mobile terminal 200 includes a short-range communication unit 201, a communication unit 202, a controller 203, and an input and output unit 204.

The short-range communication unit 201 communicates with the key unit 100 according to the same communication standard as that of the short-range communication unit 103.

The communication unit 202 connects the mobile terminal 200 to the network. In the embodiment, it is possible to communicate with another device (for example, the server device 400) over a network using a mobile communication service such as 3G or LTE.

Figure 5:
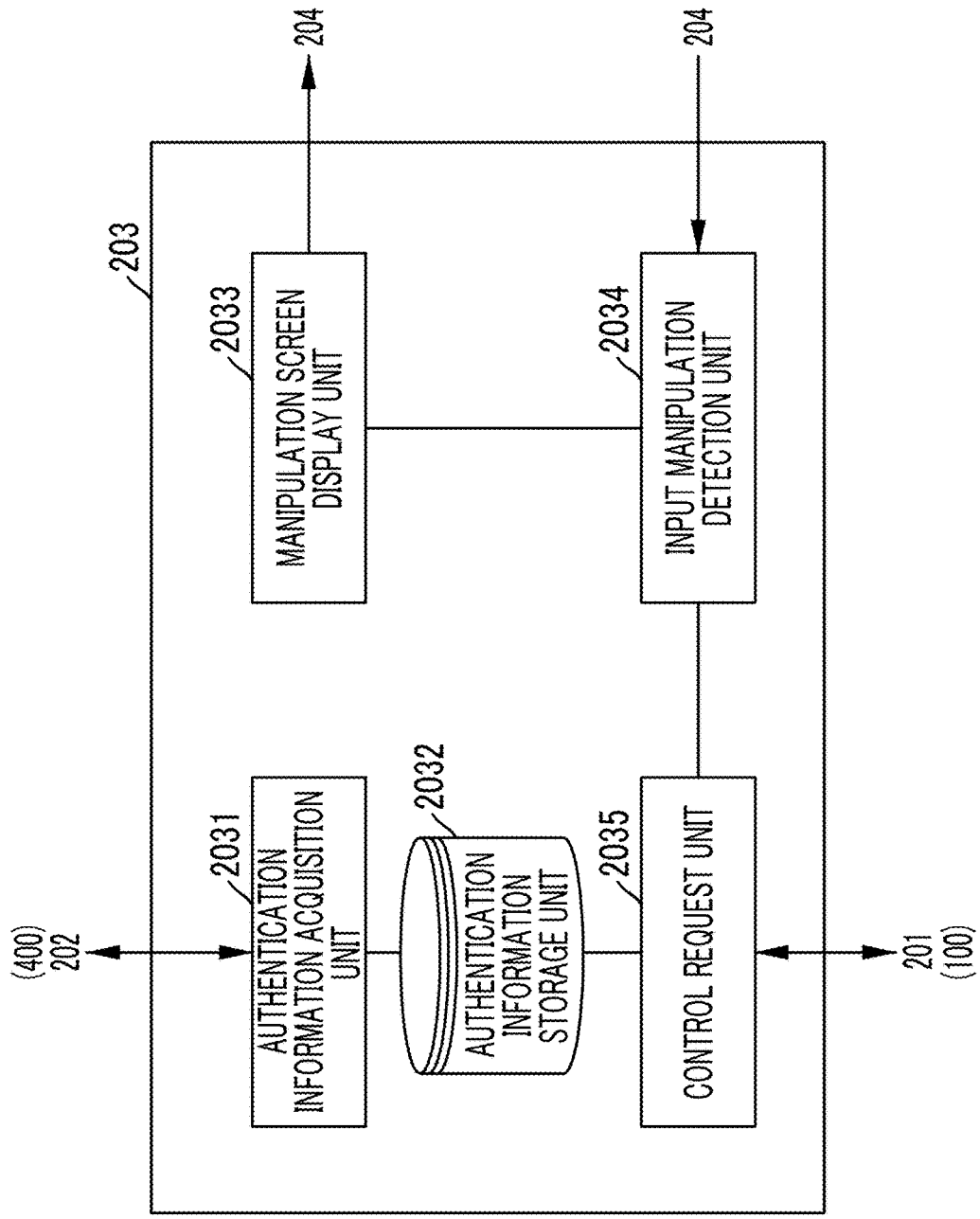
FIG. 5 illustrates an example of functional modules included in a controller of the mobile terminal.

The controller 203 is a computer that controls the mobile terminal 200. In the controller 203, a function illustrated in FIG. 5 is realized by a CPU (not illustrated) executing a program stored in storage unit (a ROM or the like). That is, the controller 203 functions as an authentication information acquisition unit 2031, an authentication information storage unit 2032, a manipulation screen display unit 2033, an input manipulation detection unit 2034, and a control request unit 2035. Some or all of the above-described functions may be realized by a dedicated logic circuit. The controller 203 performs, for example, a process of generating a vehicle control request, a process of acquiring the terminal authentication information described above, a process of displaying a screen of a user interface, a process of detecting an input manipulation of a user, and a process of transmitting a vehicle control request and terminal authentication information to the key unit 100.

The controller 203 performs interaction with the user via the input and output unit 204. The input and output unit 204 receive an input manipulation performed by the user and presenting information to the user. Specifically, the input and output unit 204 includes a touch panel, control unit for the touch panel, a liquid crystal display, and control unit for the liquid crystal display. The touch panel and the liquid crystal display are configured of one touch screen (a touch panel display) in the embodiment.

The authentication information acquisition unit 2031 performs a process of acquiring terminal authentication information. In the embodiment, the terminal authentication information is generated in the server device 400, and the authentication information acquisition unit 2031 acquires the terminal authentication information from the server device 400 via the communication unit 202. The authentication information acquisition unit 2031 stores the acquired terminal authentication information in the authentication information storage unit 2032.

The terminal authentication information acquired by the authentication information acquisition unit 2031 may be an immutable key or may be a one-time key. In either case, the device authentication information corresponding to the terminal authentication information is stored in advance in the key unit 100.

The manipulation screen display unit 2033 displays the manipulation screen on the input and output unit 204. The input manipulation detection unit 2034 detects a manipulation that the user has performed with respect to the input and output unit 204. Since the input and output unit 204 is a touch screen as described above, the input manipulation detection unit 2034 acquires a position on the screen manipulated by the user and the aspect of the input manipulation. Examples of aspects of the input manipulation include a tap input (short pressing), a long tap input (long pressing), a double tap input, a slide input, and a gesture input.

The control request unit 2035 transmits a control request for controlling the vehicle to the key unit 100 via the short-range communication unit 201 according to content of the user manipulation detected by the input manipulation detection unit 2034. In this case, the control request unit 2035 performs control so that the terminal authentication information stored in the authentication information storage unit 2032 is included in the control request and transmitted to the key unit 100. When the mobile terminal 200 does not have the terminal authentication information, the controller 203 may suppress the manipulation of the vehicle 10 from the manipulation screen from being performed.

A specific example of the user interface, for example, correspondence between a manipulation screen presented to the user or an input manipulation of the user and a control request to the vehicle 10 will be described in detail below.

Operation of System

Overview of Operation of Vehicle Control Device

An overview of an operation that is performed by the vehicle control device 300 will be described prior to detailed description of the system. The vehicle control device 300 is a device constituting a smart key system of the related art, and detects that the key unit 100 is near the vehicle or in the vehicle cabin by performing communication with the key unit 100 possessed by the user.

Specifically, the collation ECU 303 transmits the polling signal to the inside and outside of the vehicle via the LF transmitter 301 at certain periods, and receives a reply signal transmitted by the key unit 100 in response to the polling signal. A key ID unique to the key unit 100 is included in the reply signal, and a registered key ID of the key unit 100 is stored in the collation ECU 303. The collation ECU 303 performs an authentication process of the key unit 100 using the received key ID and the stored key ID. When authentication of the key unit 100 is successful, the body ECU 304 is notified that the authentication is successful, and accordingly, it is possible to cause the vehicle to perform, a predetermined operation (for example, unlocking of doors or releasing of an immobilizer).

Process of Registering Key Unit to Vehicle Control Device

Figure 6:
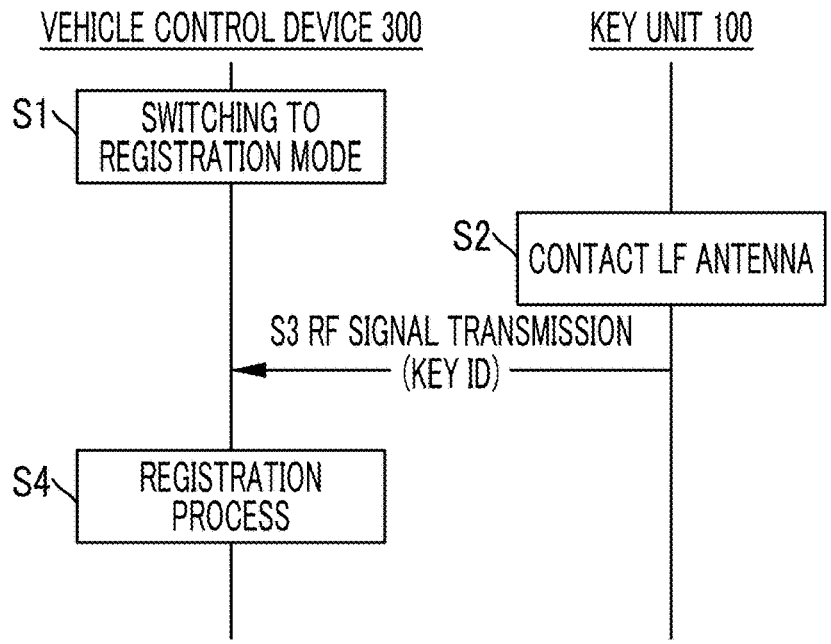
FIG. 6 is a setup flow diagram of the key unit.

Work of registering the key ID of the key unit 100 in the vehicle control device 300 will be described herein. The work is performed by a manufacturer, a maintenance company, or an owner of the vehicle. Here, a flow of the work will be described with reference to FIG. 6.

First, in step S1, the vehicle control device 300 performs switching to a mode for registering a new key ID. In this case, the vehicle control device 300 may request communication with an already registered device (for example, a smart key having a key ID that has already been stored). Accordingly, it is possible to confirm that a person performing the registration work is an authorized owner of the vehicle. In the registration mode, the vehicle control device 300 supplies a registration signal from the LF transmitter 301.

Next, in step S2, the user causes the LF antenna of the key unit 100 not to come into contact with or to come into rough contact with the antenna coil included in the vehicle control device 300 (typically built in the vicinity of a push start switch of the vehicle (not illustrated)). Accordingly, electric power is supplied from the antenna coil to the key unit 100 due to electromagnetic induction, and the key unit 100 transmits the key ID to the vehicle control device 300 using the electric power (step S3). This operation is known as an operation for registering a key ID in the vehicle in a smart key system for an automobile (generally referred to as transponder communication). The transmitted key ID is received by the vehicle control device 300 and registered as a valid key ID (step S4). That is, the vehicle control device and the key unit are linked.

The communication and the process performed between the vehicle control device 300 and the key unit 100 have been described above.

Process of Acquiring Terminal Authentication Information of Mobile Terminal

Figure 7:
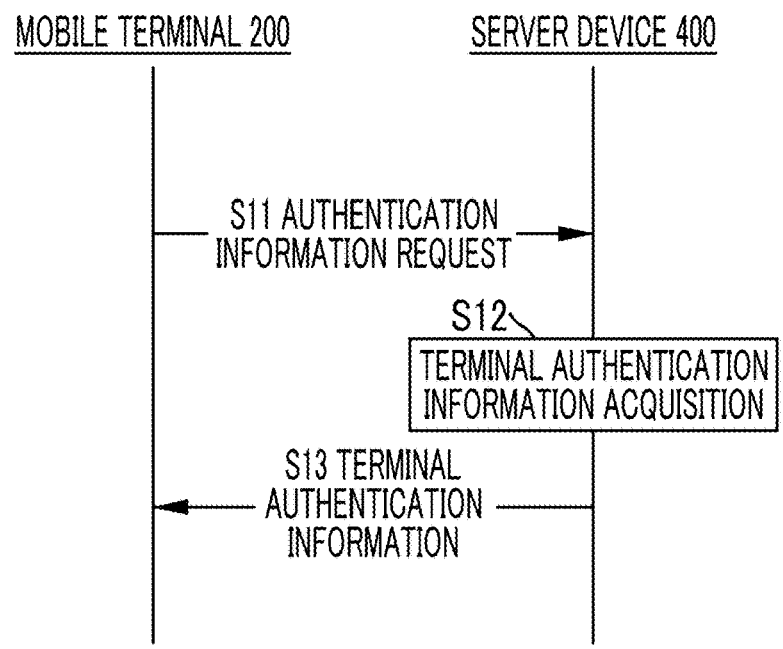
FIG. 7 is a setup flow diagram of the mobile terminal.

An operation of the vehicle control system according to the embodiment will be described with reference to FIG. 7. FIG. 7 is a flow diagram illustrating a flow of data that is transmitted and received between the respective components and a process that is performed by each component.

First, in step S11, the mobile terminal 200 requests the server device 400 to issue terminal authentication information. The terminal authentication information described herein is not information used for the vehicle control device 300 to authenticate the key unit 100, and is information used for the key unit 100 to authenticate the mobile terminal 200.

When the mobile terminal 200 transmits the information for identifying the terminal to the server device 400, the server device 400 acquires the terminal authentication information specific to the mobile terminal 200 (step S12), and transmits the acquired terminal authentication information to the mobile terminal 200 (step S13). Accordingly, it is possible to perform a manipulation of unlocking the vehicle 10 on the mobile terminal 200.

Vehicle Control Process Using Mobile Terminal

Figure 8:
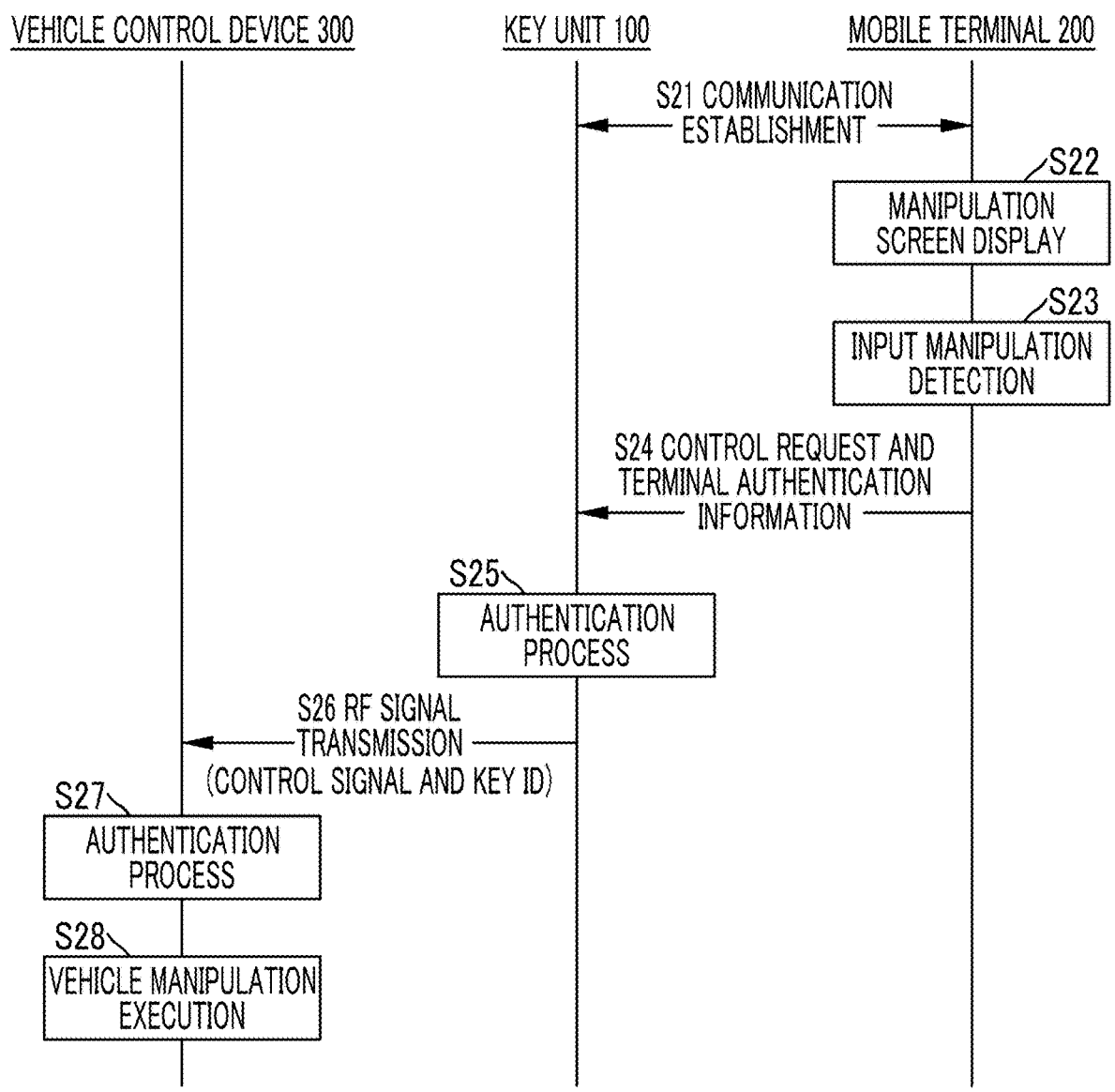
FIG. 8 is a flow diagram of data and a process between respective components.
Figures 9A, 9B:
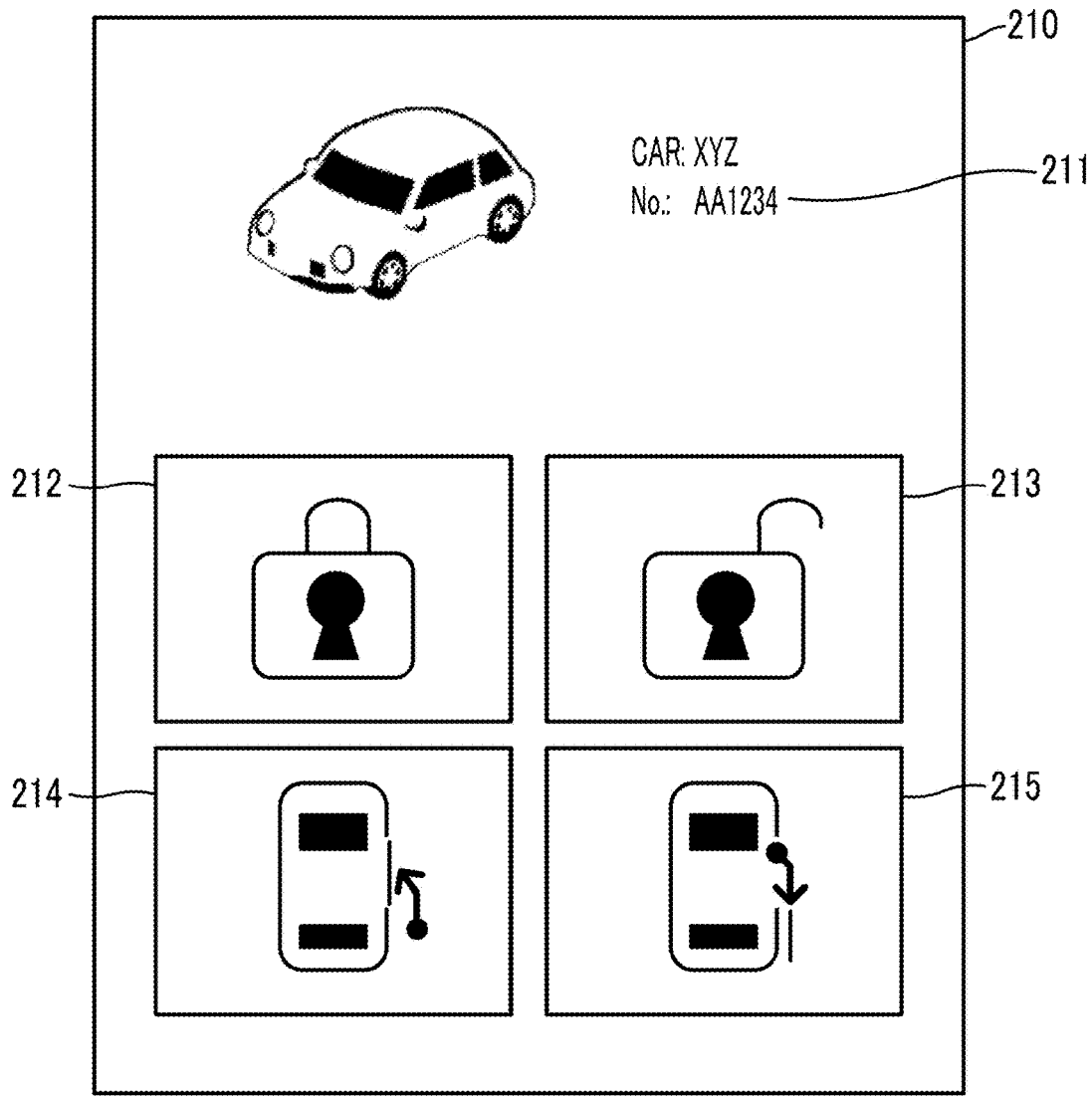
FIG. 9A is an example of a manipulation screen that is displayed on the mobile terminal.
FIG. 9B is a table showing an example of an input method and a requested operation of manipulation buttons displayed on a manipulation screen.
Figure 10A:
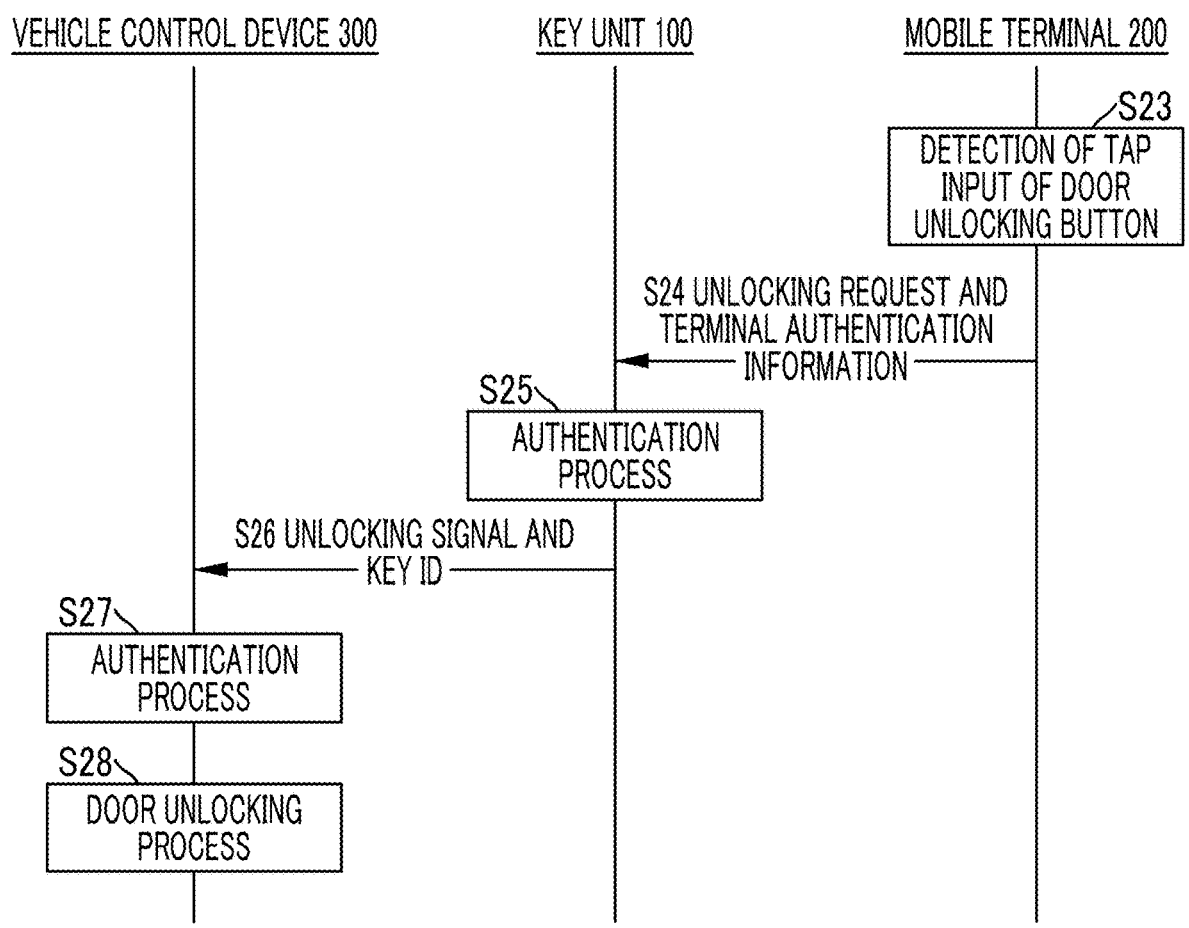
FIG. 10A is a flow diagram of data and a process between respective components when a door unlocking button and a door opening button are manipulated.
Figure 10B:
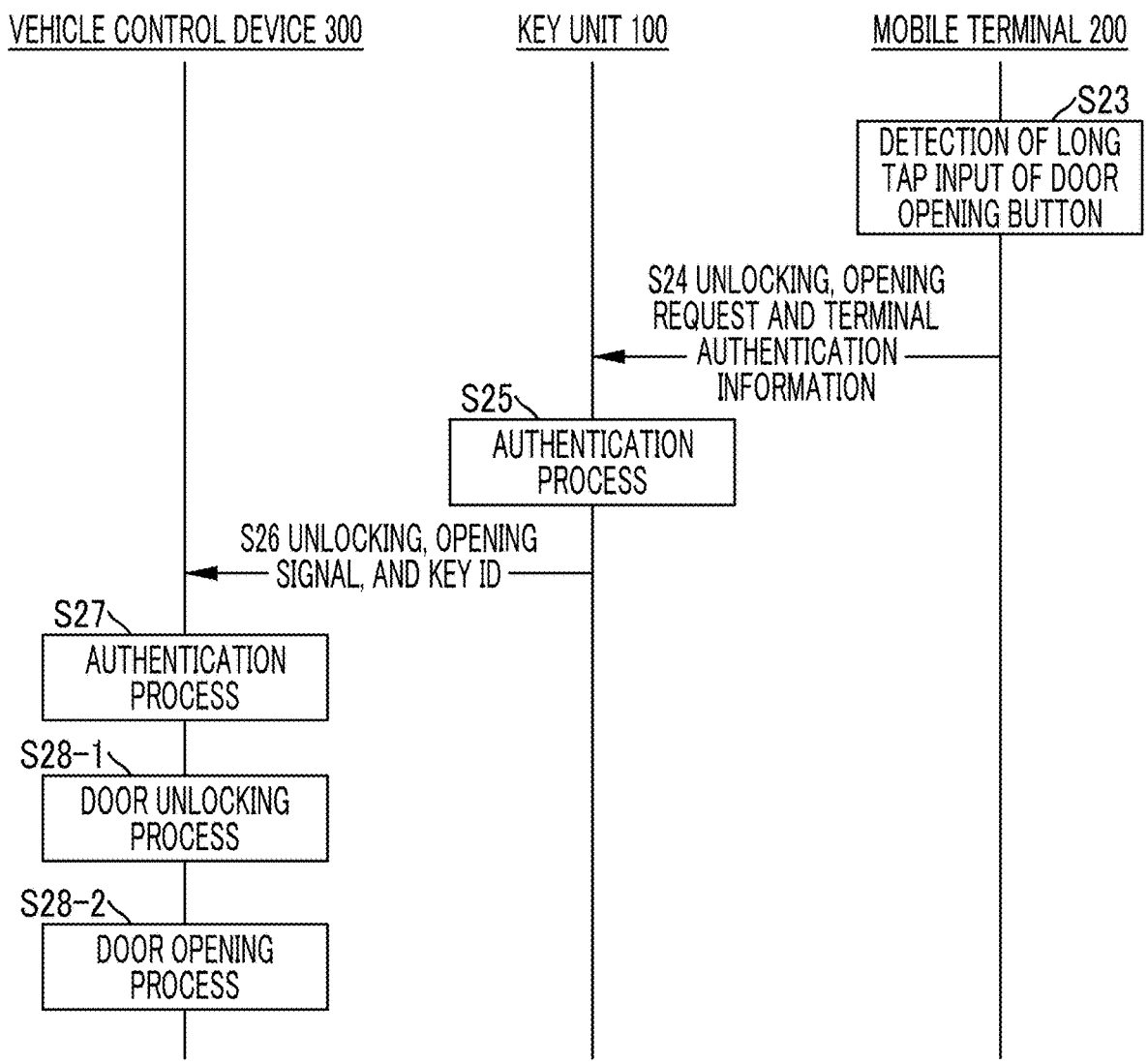
FIG. 10B is a flow diagram of data and a process between respective components when a door unlocking button and a door opening button are manipulated.

A flow of process when the user performs vehicle control using the mobile terminal 200 in the embodiment will be described with respect to FIG. 8 to FIG. 10B. FIG. 8 is a flow diagram illustrating a flow of data that is transmitted and received between the components and a process that is performed by each component. FIG. 9A is a diagram illustrating an example of a display screen of the mobile terminal 200. FIG. 9B is a diagram illustrating an example of a vehicle operation allocated to manipulation buttons on the display screen and an input method. FIG. 10A is a flow diagram illustrating a flow of control when the user requests unlocking of the door and FIG. 10B is a flow diagram illustrating a flow of control when the user requests unlocking and opening of the door.

When the mobile terminal 200 enters a communication range of the short-range communication (for example, BLE) of the key unit 100, a communication establishment process is performed between the short-range communication unit 201 of the mobile terminal 200 and the short-range communication unit 103 of the key unit 100 in step S21. By detecting the communication establishment with the key unit 100, the controller 203 of the mobile terminal 200 can determine that the vehicle 10 corresponding to the key unit 100 can be controlled.

In step S22, the manipulation screen display unit 2033 displays the manipulation screen 210 for manipulation of the vehicle 10 on the touch screen. FIG. 9A is a diagram illustrating an example of the manipulation screen 210 in the embodiment. As illustrated in FIG. 9A, the manipulation screen 210 includes information 211 for identifying the vehicle 10 that is manipulation target and four manipulation buttons (UI elements) 212 to 215. The information 211 for identifying the vehicle 10 includes at least one of an appearance, a type of vehicle, and a car number of the vehicle 10. The manipulation buttons include a door locking button 212, a door unlocking button 213, a door closing button 214, and a door opening button 215.

When the user of the mobile terminal 200 performs an input manipulation with respect to the touch screen, the input manipulation detection unit 2034 detects the input manipulation of the user in step S23. The input manipulation detection unit 2034 acquires a manipulation position and an input manipulation aspect with respect to the input manipulation of the user. The manipulation position is a position on the screen on which the user has performed the manipulation. Examples of the input manipulation aspects include a tap input (short pressing), a long tap input (long pressing), a double tap input, a slide input, and a gesture input. The gesture input is an input for moving the touch position along a predetermined locus.

In step S24, the control request unit 2035 transmits a vehicle control request according to the input manipulation of the user to the key unit 100 together with the terminal authentication information. In the embodiment, in order to request a manipulation using each of the manipulation buttons 212 to 215 included in the manipulation screen 210, the user needs to perform an input manipulation in a predetermined input aspect corresponding to the manipulation button. FIG. 9B is a diagram illustrating an example of an input method (input aspect) assigned to manipulation buttons and a vehicle operation. When a tap input is performed with respect to the door locking button 212, the control request unit 2035 requests the vehicle to lock the door. When the tap input is performed with respect to the door unlocking button 213, the control request unit 2035 requests the vehicle to unlock the door. On the other hand, when a long tap input is performed with respect to the door closing button 214, the control request unit 2035 requests the vehicle to close and lock the door. Similarly, when a long tap input is performed with respect to the door opening button 215, the control request unit 2035 requests the vehicle to unlock and open the door. The door closing button 214 and the door opening button 215 do not react even when the tap input is performed, and the control request unit 2035 does nothing.

The control request unit 2035 determines whether or not the input manipulation of the user satisfies a condition based on a manipulation position and a manipulation aspect of an input manipulation of the user, and transmits a vehicle manipulation request according to the input manipulation to the key unit 100 via the short-range communication unit 201 when the condition satisfies the condition.

For example, when the manipulation position of the input manipulation of the user is within the area of the door unlocking button 213 (the first UI element) and the input aspect is the tap input, the control request unit 2035 transmits a door unlocking request to the key unit 100. Here, the unlocking of the door corresponds to a first operation of the present disclosure, and the unlocking request corresponds to a control request for requesting the vehicle to perform the first operation.

When the manipulation position of the input manipulation of the user is within the area of the door opening button 215 (the second UI element) and the input aspect is the long tap input, the control request unit 2035 transmits a door unlocking and opening request (a request for unlocking and opening) to the key unit 100. Here, an operation including both the unlocking and opening of the door corresponds to the second operation of the present disclosure, and the unlocking and opening request corresponds to the control request for requesting the vehicle to perform the second operation.

When the control request unit 2035 transmits the vehicle manipulation request, the control request unit 2035 also transmits the terminal authentication information to the key unit 100. The terminal authentication information is acquired from the server device 400 by the authentication information acquisition unit 2031 and stored in the authentication information storage unit 2032.

When the key unit 100 receives the control request and the terminal authentication information from the mobile terminal 200 via the short-range communication unit 103, the authentication unit 1044 of the key unit 100 compares the received terminal authentication information with the device authentication information stored in advance and performs an authentication process in step S25. When the authentication is successful, the key unit 100 transmits the vehicle control signal and the key ID to the vehicle control device 300 via the RF transmitter 102 in step S26. For example, when a door unlocking request is included in the vehicle control request, the key unit 100 transmits a door unlocking control signal. When a door opening request is included in the vehicle control request, the key unit 100 transmits a door opening control signal.

When the vehicle control device 300 receives the vehicle control signal and the key ID from the key unit 100 via the RF receiver 302, the collation ECU 303 performs an authentication process based on the received key ID in step S27. When the authentication is successful, the body ECU 304 executes the manipulation of the vehicle 10 based on the vehicle control signal in step S28. Specifically, when the vehicle control signal is a door unlocking control signal, the body ECU 304 controls the door locking motor 305 to unlock the door of the vehicle 10. When the vehicle control signal is a door opening control signal, the body ECU 304 controls the door opening and closing motor 306 to open the door of the vehicle 10. In this case, answer back or the like may be performed.

FIGS. 10A and 10B are diagrams illustrating a specific process flow when the user has performed a specific process.

FIG. 10A is a diagram illustrating a process when the user performs a tap input with respect to the door unlocking button 213 on the manipulation screen 210. When the mobile terminal 200 detects the tap input on the door unlocking button 213 (S23), the mobile terminal 200 transmits an unlocking request together with the terminal authentication information to the key unit 100 (S24). The key unit 100 performs an authentication process of the terminal authentication information (S25). When the authentication is successful, the key unit 100 transmits a vehicle control signal for instructing unlocking of the door together with the key ID to the vehicle control device 300 (S26). The vehicle control device 300 performs an authentication process of the key ID (S27), and when the authentication is successful, the body ECU 304 controls the door locking motor 305 to unlock the door of the vehicle 10 (S28). A process performed when the user performs a tap input with respect to the door locking button 212 on the manipulation screen 210 is also the same as described above.

FIG. 10B is a diagram illustrating a process when the user performs a long tap input with respect to the door opening button 215 on the manipulation screen 210. When the mobile terminal 200 detects the long tap input on the door opening button 215 (S23), the mobile terminal 200 transmits an unlocking and opening request together with terminal authentication information to the key unit 100 (S24). The key unit 100 performs an authentication process of the terminal authentication information (S25). When the authentication is successful, the key unit 100 transmits a vehicle control signal for instructing unlocking and opening of the door together with the key ID to the vehicle control device 300 (S26). The vehicle control device 300 performs an authentication process of the key ID (S27). When the authentication is successful, the body ECU 304 controls the door locking motor 305 to unlock the door of the vehicle 10 (S28-1), and then controls the door opening and closing motor 306 to open the door (S28-2). A process performed when the user inputs a long tap with respect to the door closing button 214 on the manipulation screen 210 is also the same as described above.

When the door has already been unlocked when the door unlocking and opening signal has been received, the vehicle control device 300 may perform solely a door opening process.

Advantageous Effects

In the embodiment, an aspect in which the user needs to perform an input on the touch screen is different according to content of a manipulation with respect to the vehicle. That is, unlocking and locking of the door can be realized by a tapping manipulation on the touch screen, whereas a long tap input is needed to perform opening and closing of the door. With the above-described configuration, it is possible to suppress a situation in which the door is opened or closed by a manipulation not intended by the user. In the embodiment, a reason for the long tap being needed for opening and closing of the door is that design spirit in which unintentional control is not desirable to the locking and unlocking since the door is physically moved in opening and closing of the door is adopted.

In the embodiment, it is possible to cause the vehicle 10 to execute two operations including unlocking and opening of the doors through one input of the user. Since there is not needed for the user to perform two inputs, convenience for the user is enhanced.

Modification Example 1

Although the tap input is needed for locking and unlocking of the doors, and the long tap input is needed for opening and closing of the doors in the above description, an input aspect needed for a certain control may be appropriately determined according to a requirement or a design spirit of the system. Typically, an input of a more complicated aspect may be needed for a manipulation for suppressing malfunctioning. Therefore, both the long tap input and a slide input may be used instead of both the tap input and the long tap input being used. When it is desired to suppress malfunction of locking and unlocking rather than opening and closing of the door, the tap input may be needed for opening and closing of the doors, and the long tap input may be needed for locking and unlocking of the doors.

Modification Example 2

Although the button (the UI element) corresponding to the operation that can be instructed by the user is displayed on the manipulation screen 210 according to the above embodiment, the UI element displayed on the manipulation screen 210 may be other than the button. For example, a schematic image of the vehicle (for example, a top view of the vehicle) is displayed on the manipulation screen 210, and an operation to be performed by the vehicle may be determined according to a position on the touch screen on which the user performs an input manipulation. For example, when the tap input is performed in a screen area corresponding to the door, a determination may be made that unlocking or locking of the door is requested. When the long tap input is performed in the screen area corresponding to the door, the determination may be made that opening or closing of the door is requested.

Modification Example 3

Figure 11:
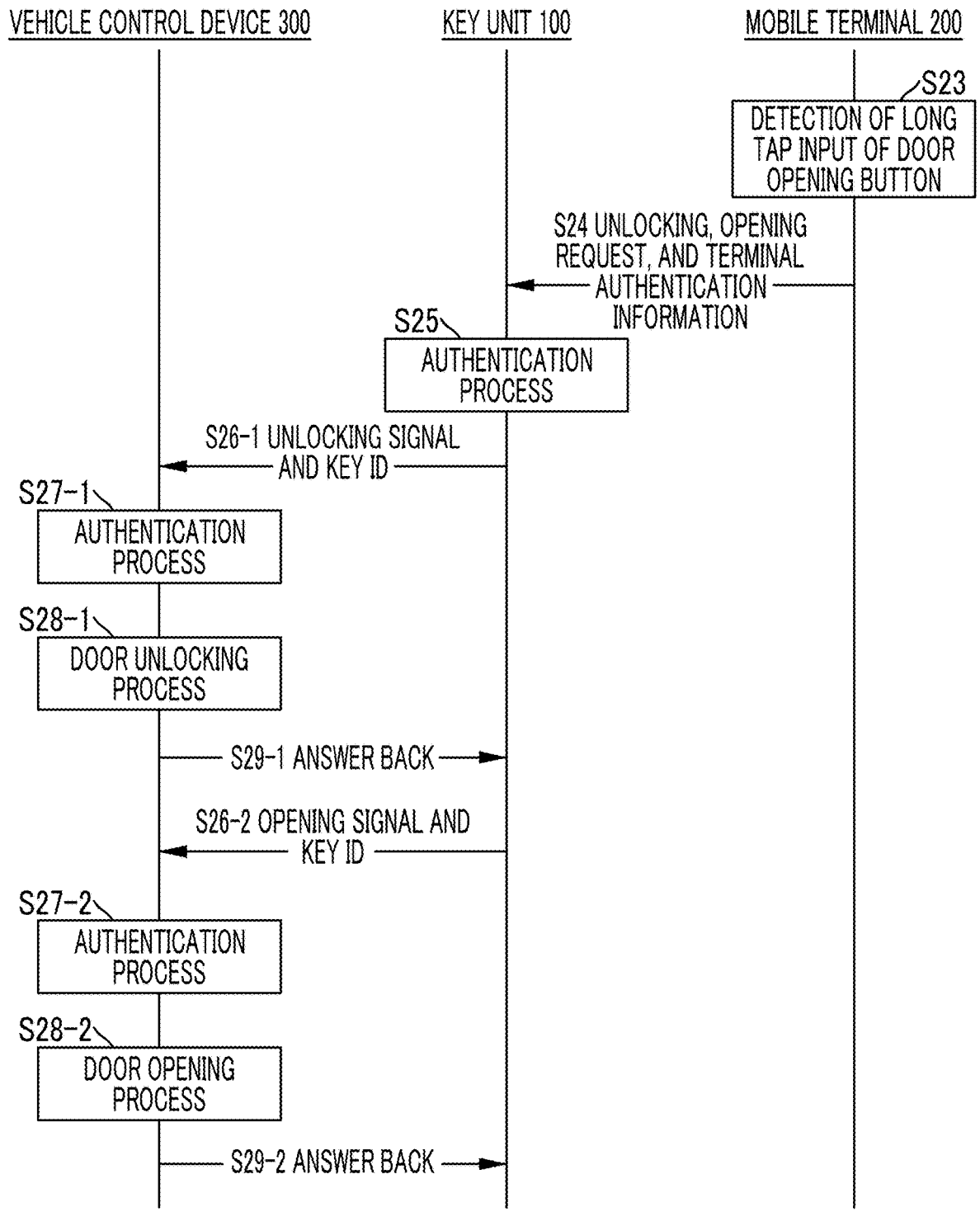
FIG. 11 is a flow diagram of data and a process between respective components when a door opening button is manipulated in a modification example.

When the door opening button 215 is manipulated, the unlocking and opening of the door are executed, but a specific realizing method thereof is not limited to the above-described method (see FIG. 10B). For example, unlocking and opening may be realized through a process as illustrated in FIG. 11. That is, first, the key unit 100 transmits a door unlocking signal to the vehicle control device 300 (S26-1), and the vehicle control device 300 performs the authentication process (S27-1) and the door unlocking process (S28-1) and transmits an answer back to the key unit 100 (S29-1). After the key unit 100 receives the answer back, the key unit 100 may transmit a door opening signal (S26-2), and the vehicle control device 300 may perform door opening process in the same manner as described above (S27-2 to S29-2). The same process as in the above embodiment can also be realized by the above-described process. A combination of both of the unlocking signal and the opening signal in the modification example corresponds to a "control signal for causing locking and unlocking of a key to be executed and causing an operation different from the locking and unlocking of the key before or after the locking and unlocking of the key to be executed" in the present disclosure. Still another realization method can be a method in which the mobile terminal 200 separately transmits the unlocking request and the opening request when the door opening button 215 is manipulated.

Modification Example 4

Although when the user manipulates the door opening button 215, the unlocking and opening of door are performed in the above-described embodiment, when the user manipulates the door opening button 215, solely the opening of the door may be performed.

FIG. 12A is a diagram illustrating a correspondence between manipulation buttons and requested operations in this modification example. In the modification example, when the door locking button 212 and the door unlocking button 213 are manipulated, the mobile terminal 200 transmits a vehicle control signal for causing the door of the vehicle 10 to be locked and unlocked (a control request for requesting the vehicle to perform a first operation) to the key unit 100. On the other hand, when the door closing button 214 and the door opening button 215 are manipulated, the mobile terminal 200 transmits a vehicle control signal for causing closing and opening of the door of the vehicle to be executed (a control request for requesting the vehicle to perform a second operation) to the key unit 100. As described above, the second operation may not include locking or unlocking of the door and may be an operation different from locking and unlocking of the door.

Modification Example 5

Although the vehicle operation performed when the manipulation buttons 212 to 215 are manipulated is fixed in the above description, a plurality of input aspects may be set for one manipulation button, and different types of vehicle operation may be executed according to the input aspect.

FIG. 12B is a diagram illustrating a correspondence between the manipulation buttons and the requested operations in the modification example. In the modification example, solely when the long tap input is performed with respect to the door closing button 214, solely the operation of closing the door is performed, and when the slide input is performed with respect to the same door closing button 214, the door closing and locking operation may be performed.

When the slide input is performed in a direction (for example, in a downward direction) that is on a predetermined manipulation button, the door may be opened, and when the slide input is performed in an opposite direction (for example, in an upward direction) that is on the predetermined manipulation button, the door may be closed. Three or more input aspects may be assigned to one manipulation button and different requested operations may be associated with the input aspects.

Modification Example 6

In the manipulation screen 210 according to the above embodiment, the door locking button 212 and the door unlocking button 213 are simultaneously displayed. Here, the mobile terminal 200 communicates with the vehicle 10 (the vehicle control device 300) to acquire a locked state (a state in which the door is locked or a state in which unlocked) of the door, and according to the locked state of the door, any one of the door locking button 212 and the door unlocking button 213 may be displayed. Similarly, a door opening and closing state (a state in which the door is opened or a state in which closed) may be acquired so that solely any one of the door closing button 214 and the door opening button 215 may be displayed according to the door opening and closing state.

Further, the manipulation buttons to be displayed may be determined in consideration of both the door locked state and the door opening and closing state. For example, when the door is unlocked and closed, the door locking button 212 and the door opening button 215 may be displayed. When the door is unlocked and opened, solely the door closing button 214 may be displayed. When the door is locked (and closed), solely the door unlocking button 213 may be displayed.

Switching between validation (enable) and invalidation (disable) of the manipulation buttons may be performed instead of switching between a display and a non-display of the manipulation buttons.

Modification Example 7

In the above description, the manipulation target is the sliding door of the vehicle 10, but the manipulation target is not limited thereto. For example, an opening and closing body such as a door, a bonnet, a trunk, or a rear hatch other than the sliding door of the vehicle 10 may be a target. The locking that is a locking and unlocking target may be locking of a door that is an opening and closing target or may not be the locking of a door that is an opening and closing target.

Although two operations including locking and unlocking the door and opening and closing of the door are executed by one manipulation button on the mobile terminal 200 in the above description, the door may not necessarily be a control target in the two operations to be executed at the same time. For example, unlocking of the door and an operation of an air conditioner may be executed by one manipulation button. In addition to the air conditioner, a seat position, a steering wheel position, and the like may be executed.

Modification Example 8

Although the mobile terminal 200 acquires the terminal authentication information from the server device 400 in the above description, the device may be manufactured and sold in a state in which the authentication information is stored in the authentication information storage unit 2032. Alternatively, the mobile terminal 200 may acquire the terminal authentication information via a detachable storage medium. In this modification example, the mobile terminal 200 may not include the communication unit 202.

Modification Example 9

Although the vehicle control device 300 and the key unit 100 perform wireless communication in the above embodiment, the vehicle control device 300 and the key unit 100 may perform wired communication. That is, the key unit 100 may be directly connected to a vehicle network (for example, a controller area network (CAN)).

The key unit 100 and the vehicle control device 300 may be integrated to implement a system. In this case, the two pieces of authentication information including the terminal authentication information and the key ID are not used, and when the authentication information transmitted from the mobile terminal 200 is authorized, the vehicle system may execute control (unlocking or the like) with respect to the vehicle.

Modification Example 10

Although the control target is the vehicle in the above description, a target manipulated by the mobile terminal is not limited to the vehicle. The manipulation target may be, for example, a facility or a building other than the vehicle. Specifically, locking and unlocking or opening and closing of doors of the facility or the building may be performed using the mobile terminal 200. In this case, activation or stop of an air conditioner, a lighting device, a monitoring device, or the like may be controlled together with locking and unlocking of doors, as well as locking and unlocking of the doors and opening and closing of the doors.

What is claimed is:

1. A vehicle manipulation device configured to control a vehicle by wirelessly communicating with a communication device in the vehicle, the vehicle manipulation device comprising:
    a touch panel;
    a controller configured to
        detect an input manipulation of a user with respect to the touch panel; and
        transmit a first control request for causing the vehicle to perform a first operation to the communication device in response to detection of an input manipulation in a first aspect in an area of the touch panel corresponding to the first operation, the first operation being any one of locking and unlocking of the vehicle,
        configured to transmit a second control request for causing the vehicle to perform a second operation to the communication device in response to detection of the input manipulation in a second aspect in an area of the touch panel corresponding to the second operation, the second aspect is different from the first aspect, the second operation including an operation different from locking and unlocking of the vehicle, and
        configured to transmit a third control request for causing the vehicle to perform a third operation of unlocking or locking of the vehicle and opening or closing an opening and closing body of the vehicle in response to the detection of the input manipulation in a third aspect in the area of the touch panel corresponding to the second operation, the third aspect is different from the second aspect.

2. The vehicle manipulation device according to claim 1, wherein:
    the area of the touch panel corresponding to the first operation is a display area of a first user interface element on the touch panel;
    the area of the touch panel corresponding to the second operation is a display area of a second user interface element different from the first user interface element on the touch panel; and
    the area of the touch panel corresponding to the third operation is the display area of the second user interface element different from the first user interface element on the touch panel.

3. The vehicle manipulation device according to claim 1, wherein the input manipulation in the first aspect, the input manipulation in the second aspect, the input manipulation in the third aspect are any one of a tap input, a double tap input, a long tap input, a slide input, and a gesture input on the touch panel.

4. The vehicle manipulation device according to claim 1, wherein:
    the input manipulation in the first aspect is a tap input on the touch panel; and
    the input manipulation in the second aspect is any one of a double tap input, a long tap input, a slide input, and a gesture input on the touch panel.

5. The vehicle manipulation device according to claim 1, wherein:
    the second operation includes locking or unlocking of the vehicle and an operation different from the locking and unlocking of the vehicle; and
    the controller is configured to transmit the second control request for causing the vehicle to perform locking or unlocking of the vehicle and the operation different from the locking and unlocking of the vehicle to the communication device in response to detection of the input manipulation in the second aspect.

6. The vehicle manipulation device according to claim 1, wherein the second operation is the operation of opening and closing the opening and closing body included in the vehicle.

7. The vehicle manipulation device according to claim 6, wherein the controller is configured to transmit the third control request for causing the vehicle to perform unlocking of the vehicle and an operation of opening an opening and closing body included in the vehicle, or an operation of closing the opening and closing body and locking of the vehicle to the communication device in response to the detection of the third input manipulation in the third aspect.

8. A vehicle system comprising:
    the vehicle manipulation device according to claim 1;
    a vehicle control device configured to perform control of the vehicle, the vehicle control device being mounted in the vehicle; and
    the communication device mounted on the vehicle, the communication device including a short range communication unit configured to perform communication with the vehicle manipulation device in a first communication standard, and a receiver and a transmitter configured to perform communication with the vehicle control device in a second communication standard different from the first communication standard, wherein:
    the vehicle manipulation device is configured to transmit the first control request to the communication device together with first authentication information;
    the communication device is configured to transmit a different control request corresponding to the first control request to the vehicle control device together with second authentication information when authentication of the first authentication information is successful; and
    the vehicle control device is configured to execute an operation instructed by the second control request when authentication of the second authentication information is successful.

9. The vehicle manipulation device according to claim 1, wherein the third aspect is different from the first aspect.

10. A vehicle manipulation method that is performed by a vehicle manipulation device including a touch panel, the vehicle manipulation method comprising:
    detecting an input manipulation of a user with respect to the touch panel; and transmitting a first control request for causing a vehicle to perform a first operation to a communication device in the vehicle in response to detection of an input manipulation in a first aspect in an area of the touch panel corresponding to the first operation, the first operation being any one of locking and unlocking of the vehicle, transmitting a second control request for causing the vehicle to perform a second operation to the communication device in response to detection of the input manipulation in a second aspect in an area of the touch panel corresponding to the second operation, the second aspect is different from the first aspect, the second operation including an operation different from locking and unlocking of the vehicle, and transmitting a third control request for causing the vehicle to perform a third operation of unlocking or locking of the vehicle and of opening or closing an opening and closing body of the vehicle in response to the detection of the input manipulation in a third aspect in the area of the touch panel corresponding to the second operation, the third aspect is different from the second aspect.

11. The vehicle manipulation method according to claim 10, wherein the third aspect is different from the first aspect.

12. A storage medium that stores a program and is a computer-readable non-transitory storage medium, the program causing a computer including a touch panel to execute:

a detection step of detecting an input manipulation of a user with respect to the touch panel; and a request step of transmitting a first control request for causing a vehicle to perform a first operation to a communication device in the vehicle in response to detection of an input manipulation in a first aspect in an area of the touch panel corresponding to the first operation, the first operation being any one of locking and unlocking of the vehicle, transmitting a second control request for causing the vehicle to perform a second operation to the communication device in response to detection of the input manipulation in a second aspect in an area of the touch panel corresponding to the second operation, the second aspect is different from the first aspect, the second operation including an operation different from locking and unlocking of the vehicle, and transmitting a third control request for causing the vehicle to perform a third operation of unlocking or locking of the vehicle and of opening or closing an opening and closing body of the vehicle included in the vehicle in response to the detection of the input manipulation in a third aspect in the area of the touch panel corresponding to the second operation, the third aspect is different from the second aspect.

13. The storage medium according to claim 12, wherein:

the area of the touch panel corresponding to the first operation is a display area of a first user interface element on the touch panel;

the area of the touch panel corresponding to the second operation is a display area of a second user interface element different from the first user interface element on the touch panel; and the area of the touch panel corresponding to the third operation is the display area of the second user interface element different from the first user interface element on the touch panel.

14. The storage medium according to claim 12, wherein the input manipulation in the first aspect, the input manipulation in the second aspect, and the input manipulation in the third aspect are any one of a tap input, a double tap input, a long tap input, a slide input, and a gesture input on the touch panel.

15. The storage medium according to claim 12, wherein:

the input manipulation in the first aspect is a tap input on the touch panel; and the input manipulation in the second aspect is any one of a double tap input, a long tap input, a slide input, and a gesture input on the touch panel.

16. The storage medium according to claim 12, wherein:

the second operation includes locking or unlocking of the vehicle and an operation different from the locking and unlocking of the vehicle; and the request step includes transmitting the second control request for causing the vehicle to perform locking or unlocking of the vehicle and an operation different from the locking and unlocking of the vehicle to the communication device in response to detection of the input manipulation in the second aspect.

17. The storage medium according to claim 12, wherein the second operation is the operation of opening and closing the opening and closing body included in the vehicle.

18. The storage medium according to claim 17, wherein the request step includes transmitting the third control request for causing the vehicle to perform unlocking of the vehicle and an operation of opening the opening and closing body included in the vehicle, or an operation of closing the opening and closing body and locking of the vehicle to the communication device in response to the detection of the third input manipulation in the third aspect.

19. The storage medium according to claim 12, wherein the third aspect is different from the first aspect.

* * * * *

UNITED STATES PATENT AND TRADEMARK OFFICE
CERTIFICATE OF CORRECTION

PATENT NO. : 11,029,840 B2  
APPLICATION NO. : 16/165117  
DATED : June 8, 2021  
INVENTOR(S) : Yasuyuki Tamane, Tsukasa Takahashi and Masaki Oshima Page 1 of 1

It is certified that error appears in the above-identified patent and that said Letters Patent is hereby corrected as shown below:

In the Specification

In Column 9, Line(s) 11, after "transmit", delete ",".

In Column 10, Line(s) 6, delete "hot" and insert --not--, therefor.

In Column 12, Line(s) 6, after "perform", delete ",".

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*